March 30, 1965 W. E. KUHN 3,175,884
SUBMICRON SILICON CARBIDE
Filed May 1, 1961

INVENTOR
William E. Kuhn
BY
HIS ATTORNEY

3,175,884
SUBMICRON SILICON CARBIDE
William E. Kuhn, Niagara Falls, N.Y., assignor to The Carborundum Company, Niagara Falls, N.Y., a corporation of Delaware
Filed May 1, 1961, Ser. No. 106,949
6 Claims. (Cl. 23—208)

This invention relates to silicon carbide, more particularly to a silicon carbide having a novel crystal configuration and particle sizes.

Silicon carbide is a well-known and highly useful refractory material. Approximately 110,000 tons of this high temperature product are produced annually in United States and Canada utilizing Acheson-type resistance furnaces wherein admixtures of carbon and silica are heated by electrical resistance. The product may be a blue, black, or green mass of extremely hard crystalline material which, after crushing and grinding operation, yields a commercial product having a hexagonal or alpha crystal structure and a grain size ranging from 30 to 1000 grit.

This invention provides a powdery silicon carbide having a very low bulk density and containing a plurality of unique crystalline shapes. The crystal sizes are predominately submicron, all the crystals being submicron in at least one dimension and most of the crystals being of submicron size in all dimensions. This novel silicon carbide has demonstrated excellent properties in polishing both ferrous and non-ferrous metals. In tests on brass, steel, aluminum and other metals, results show stock removal rates up to five times as great as commercial alumina polishing agents which are now used in the final stages of metallographic polishing; and the product of this invention produced an equivalent surface finish to that produced by the alumina polishing agent while providing this high stock removal rate. The properties of the product suggest many other useful applications. For example, its low bulk density makes it attractive as an insulation material. The product can be used as pigment for paints and the like, the small particles having excellent covering and rheological properties.

The features and advantages of the present invention will become more fully apparent from consideration of the following description of the product taken in conjunction with the appended drawings, in which.

Two grades of the product of this invention are made, a crude reactor effluent and a treated product. The product is characterized by (1) its particle size which is predominately submicron and (2) its crystalline structure which includes a plurality of unique crystal configurations. The crude product is further characterized by its low bulk density resulting from an interdispersion of fibrous material therein.

The product which constitutes this invention can be prepared by high-temperature arc heating utilizing either a granular or pelletized feed or a consumable electrode arc technique. These methods are fully described in patent applications filed concurrently with this application titled, "Process and Apparatus for the Manufacture of Particulate Refractories" and "Process for the Production of Submicron Silicon Carbide," bearing Serial Numbers 106,595 and 106,596, respectively. Reference may be had to those applications for a complete description of the methods of manufacture and therefore, will not be included herein. Essentially, the preparation includes feeding the raw materials, silica and carbon, to a reaction chamber wherein a high-temperature arc is created. The arc vaporizes the reactants, and the vapors react with each other forming minute particles of silicon carbide. The particles are carried out of the reaction chamber in a carrier gas and are recovered by cyclone separators or electrostatic precipitators. The effluent, as it is recovered from the reactor, is what is termed herein the "crude product." For some applications a more refined product may be desired. Therefore, the crude product may be purified by acid leaching, alkali leaching, or controlled oxidation, which produces the silicon carbide termed herein the "treated product."

Figure 1:
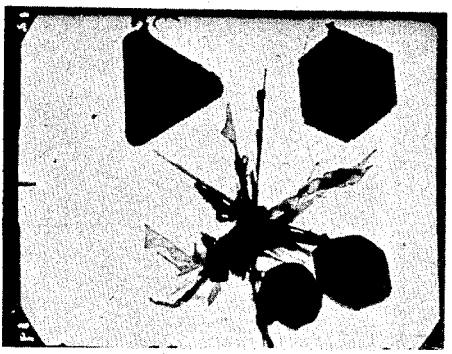
FIGURE 1 is an electron photomicrograph at a magnification of 5,000× showing the triangular and hexagonal platelets of the silicon carbide of this invention.
Figure 2:
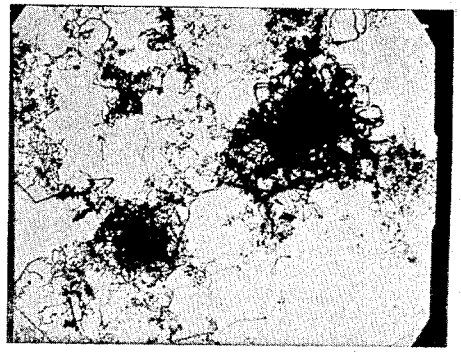
FIGURE 2 is an electron photomicrograph at a magnification of 10,000× showing fibrous forms of the product of this invention.
Figure 3:
FIGURE 3 is an electron photomicrograph at a magnification of 80,000× showing ribbon-like forms of the product of this invention.
Figure 4:
FIGURE 4 is an electron photomicrograph at a magnification of 5,000× showing whisker forms of silicon carbide of this invention.
Figure 5:
FIGURE 5 is an electron photomicrograph at a magnification of 20,000× of embryo-like agglomerates of crystals and fibers of the product of this invention.

The photomicrographs which comprise the drawings hereof are representative of the morphology of the product. In general, the shapes of the particles may be classified as plates (FIG. 1), whiskers (FIG. 4), ribbons (FIG. 3), and miscellaneous other growth forms that can be recognized in the photomicrographs. The crude product also contains fibrous material (FIG. 2) which is believed to result from the condensation of silicon monoxide into submicron fibers which later disproportionate into silica and silicon.

A summary of typical crystal configurations observed and their approximate sizes are as follows:

| Configuration | Approximate Size in Microns |
| --- | --- |
| Triangular and hexagonal platelets | .01 to 10 in breadth; 0.2 to <.01 in thickness. |
| Whiskers | 3 to <.05 in length; 0.1 to 0.01 in width; 0.2 to <0.01 in thickness. |
| Ribbons | Several microns in length; up to 3 or 4 microns in width; <0.01 in thickness. |
| Miscellaneous Growth Forms: | |
| Distorted plates | Several microns to less than one micron in length and width; <1.0 in thickness. |
| Spikes | Several microns to less than one micron in length; <1.0 in thickness. |
| Spheres | 0.01. |
| Fibers | .005 to .03 in diameter; 0.1 to 2 in length. |

The platelets, including the triangular and hexagonal plates and the distorted plates together with the fibrous materials predominate in the crude particles. While a few of the platelets are as large as 10 microns in breadth, they are predominantly submicron in breadth. The fibrous materials are largely removed by acid leaching and thus, are not present in the treated product to any substantial extent. The finer materials, the needles, spheres, ribbons and extremely small platelets, are more readily oxidized than the other type.

Properties of the two grades of the product are summarized in the following table:

| Properties | Crude Grade | Treated Grade |
|---|---|---|
| Approximate particle size_____microns__ | 0.06 to 0.10 | 0.22. |
| Color_____ | Green | Light green. |
| Bulk density_____lb./cu. ft__ | 6.24 | 55. |
| Electrical resistivity_____ohm-cm__ | $10^{12}$ | $10^2$. |
| Chemical analysis: | | |
| SiC_____percent__ | 75-96 | 95-99. |
| $SiO_2$_____do____ | 4-25 | .05-2. |
| Free Si_____do____ | 1-5 | Nil. |
| Free C_____do____ | 0-5 | Nil. |

X-ray diffraction methods were used to determine the particle size. They show particle sizes of about 0.06 to 0.10 micron for the crude product and 0.22 micron for the acid treated product. X-ray diffraction also indicated the presence of beta silicon carbide and faint indications of alpha silicon carbide, graphite, silicon, and, in some cases, cristobalite. Spectrographic analysis indicated the presence of iron in an amount in the range of 0.1 to 0.5% by weight of the crude product with traces of other materials depending upon the purity of the raw materials and the atmosphere used in making the product. The iron is readily removed by acid leaching.

Electrical resistance tests of the product were made in a packed column using a pressure of approximately 250 p.s.i. The crude product showed a resistivity of about $10^{12}$ ohm-centimeters, and the acid treated product showed a resistivity of approximately $10^2$ ohm-centimeters. Increase of field strength from $10^2$ to $10^5$ volts per meter caused a decrease in resistivity of less than one order of magnitude in both cases. Electrical resistance of a thin film of crude product exhibited an extremely high sensitivity to humidity.

Stable aqueous dispersions of submicron silicon carbide were produced by ball milling the powders in a water solution of 0.2% by weight of sodium hexametaphosphate dispersion agent for one to ten hours. Solids content of the dispersion were produced in the range of 0.182 to 0.21 gram per cubic centimeter.

Chemically, the product of this invention is stable in an inert atmosphere to 2200° C. However, due to the fine particle size of the product, it is easily oxidized at temperatures of about 1000° C. and above. When the hydrofluoric acid leached material is heated in air at a heating rate of about 1400° C. per hour followed by holding at 1450° C. for 30 minutes, a weight loss of about 1% occurs at 100–200° C. probably due to absorbed water; thereafter the product increases in weight by 16% representing a 32% oxidation. This characteristic provides a means for the production of silica of extremely fine particle sizes. The product begins to chlorinate at 700° C. and actively chlorinates at 1000° C.

Corrosion resistance of the product in aqueous acid solutions was determined by boiling a suspension of 10 grams of crude grade in 600 ml. of aqueous acid and analyzing for dissolved silicon. The following results were obtained after 24 hours and 144 hours.

| Test Solution | Total Silicon Dissolved, gms. per milliliter | |
|---|---|---|
| | 24 hrs. | 144 hrs. |
| 20% HCl | $1.0 \times 10^{-5}$ | $1.0 \times 10^{-5}$ |
| 70% $HNO_3$ | $0.4 \times 10^{-5}$ | $0.3 \times 10^{-5}$ |
| 50% $H_2SO_4$ | $0.2 \times 10^{-5}$ | $0.3 \times 10^{-5}$ |
| 50% $H_3PO_4$ | $1.0 \times 10^{-5}$ | $7.0 \times 10^{-5}$ |

One particular feature of the silicon carbide of this invention is that the crystals themselves are submicron in size and therefore have a high degree of perfection. If submicron grains were formed by comminution of larger crystals the surfaces of the grains would be ruptured surfaces and, thus, to that extent imperfect.

Having thus fully and completely described the invention, it is desired to claim:

1. A new article of manufacture consisting essentially of a mixture of crystals of silicon carbide and acid leachable silicon-containing fibrous materials, said crystals of silicon carbide being submicron in size in at least one dimension and having a plurality of crystal configurations including platelets, whiskers and ribbons, said crystals being substantially free of ruptured surfaces.

2. An article as defined in claim 1 in which said crystals are predominately submicron in size in all dimensions.

3. An article as defined in claim 1 which is characterized by a bulk density of about 6 pounds per cubic foot.

4. An article as defined in claim 1 which contains from about 75% to 96% of silicon carbide.

5. An article as defined in claim 1 which has an electrical resistivity of the order of $10^{12}$ ohm-cm.

6. As a new article of manufacture a mass of silicon carbide in powder form characterized by crystals substantially free of ruptured surfaces and predominantly submicron in size, said crystals having a plurality of configurations including platelets, ribbon-like forms, and whiskers.

References Cited by the Examiner
UNITED STATES PATENTS

| 2,364,108 | 12/44 | Swentzel | 29—182.8 |
| 2,894,929 | 7/59 | Newton et al. | 23—182 |
| 2,979,449 | 4/61 | Sheer et al. | 204—164 |
| 3,014,872 | 12/61 | Scott | 252—62 |

FOREIGN PATENTS

| 592,456 | 2/60 | Canada. |
| 1,047,180 | 12/58 | Germany. |

OTHER REFERENCES

Proceedings of the Conference on Silicon Carbide, Boston, Mass., April 2 and 3, 1959. Published in Silicon Carbide, a High Temperature Semiconductor, Pergamon Press, 1960, page 101.

MAURICE A. BRINDISI, *Primary Examiner.*